US008705346B2

(12) United States Patent
Wang et al.

(10) Patent No.: US 8,705,346 B2
(45) Date of Patent: Apr. 22, 2014

(54) METHOD AND SYSTEM FOR JOINT DETECTION OF ETHERNET PART SEGMENT PROTECTION

(75) Inventors: Bin Wang, Shenzhen (CN); Ting Ao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 194 days.

(21) Appl. No.: 13/376,722

(22) PCT Filed: Sep. 2, 2009

(86) PCT No.: PCT/CN2009/073688
§ 371 (c)(1),
(2), (4) Date: Dec. 7, 2011

(87) PCT Pub. No.: WO2010/142091
PCT Pub. Date: Dec. 16, 2010

(65) Prior Publication Data
US 2012/0127868 A1  May 24, 2012

(30) Foreign Application Priority Data

Jun. 8, 2009  (CN) .......................... 2009 1 0086844

(51) Int. Cl.
*H04J 1/16* (2006.01)

(52) U.S. Cl.
USPC .......................................... 370/217; 370/221

(58) Field of Classification Search
USPC .................................................. 370/216–228
See application file for complete search history.

(56) References Cited

U.S. PATENT DOCUMENTS

2009/0154364 A1* 6/2009 Felkar et al. .................. 370/245

2009/0161672 A1* 6/2009 Shimada ....................... 370/389
2010/0110881 A1 5/2010 Ryoo et al.
(Continued)

FOREIGN PATENT DOCUMENTS

| CN | 101227399 A | 7/2008 |
| CN | 101364926 A | 11/2009 |
| EP | 1575221 A1 | 9/2005 |
| WO | 2008120931 A1 | 10/2008 |

OTHER PUBLICATIONS

English translation of international search report of PCT/CN2009/073688.
Sultan, et al.: "PBB-TE Segment Protection Technical Proposal"; Jan. 2009; pp. 1-14.
Hundessa, et al.: "Optimal Guaranteed Alternative LSP for Multiple Failures"; Department d'Arquitectrua de Computadors Universitat Politecnica de Catalunya (UPC); 2004; pp. 59-64.

(Continued)

*Primary Examiner* — Andrew Lee
(74) *Attorney, Agent, or Firm* — McClure, Qualey & Rodack, LLP (57) ABSTRACT

The present invention discloses a method for detection of Ethernet segment protection, and this method includes: configuring a detection point in two segment protection domains with a shared link; configuring a joint monitor group on the shared link of said two segment protection domains; and judging whether the configured detection point and the joint monitor group receive a Continuity Check Message (CCM) in a certain period, if the CCM message is received, determining a detected segment corresponding to this CCM message is normal; if the CCM message is not received, determining the detected segment corresponding to this CCM message has a fault. The present invention further discloses a system for detection of Ethernet segment protection, including: a detection point configuration unit, a joint monitor group configuration unit and a judgment unit. The method and system of the present invention can solve the problem of the segment protection in the case of the multi-node fault and greatly improve the network performance.

8 Claims, 6 Drawing Sheets

(56) References Cited

U.S. PATENT DOCUMENTS

| | | | |
|---|---|---|---|
| 2010/0238791 A1* | 9/2010 | Duncan et al. | 370/216 |
| 2011/0267940 A1* | 11/2011 | Koch et al. | 370/222 |
| 2012/0008491 A1* | 1/2012 | Shimada | 370/218 |
| 2012/0195191 A1* | 8/2012 | Saltsidis et al. | 370/228 |
| 2013/0003532 A1* | 1/2013 | Vinod et al. | 370/225 |
| 2013/0028071 A1* | 1/2013 | Martin et al. | 370/217 |

OTHER PUBLICATIONS

Park, et al.: "Dynamic Path Management with Resilience Constraints under Multiple Link Failures in MPLS/GMPLS Networks"; IEEE Transactions on Dependable and Secure Computing, vol. 5, No. 3, Jul.-Sep. 2008; pp. 143-154.

Ting, et al.: "Requirements of PBB-TE Segment Protection for Consideration"; Mar. 2009.

* cited by examiner

METHOD AND SYSTEM FOR JOINT DETECTION OF ETHERNET PART SEGMENT PROTECTION

CROSS REFERENCE RELATED APPLICATIONS

This application is a national phase of PCT/CN2009/073688 filed Sep. 2, 2009, which claims priority to China Application Serial No. 200910086844.1, filed Jun. 8, 2009, both of which are entirely incorporated herein by reference.

TECHNICAL FIELD

The present invention relates to the field of the Ethernet protection detection technique in the network communication, and in particular, to a method and a system for joint detection of Ethernet segment protection.

BACKGROUND OF THE RELATED ART

With the raising of the concept of the Carrier Ethernet (CE), the connection oriented Ethernet technique—the Provider Backbone Transport (PBT) is also implemented in October, 2005 for the purpose of satisfying the requirement of the telecommunication network. Afterwards, there are both domestic and foreign providers using the PBT technique to network, which provides a very good beginning for the development of the PBT technique in the metropolitan area network.

The basis of the PBT technique is the Provider Backbone Bridge (PBB) technique defined in the IEEE 802.1ah, and the IEEE calls the PBT technique the Provider Backbone Bridge Traffic Engineering (PBB-TE) technique. The PBB-TE technique is on a basis of the PBB technique, and its core is to improve the PBB technique. The source device of the CE inserts a Backbone Destination Medium Access Control (MAC) Address (B-DA), a Backbone Source MAC Address (B-SA), a Backbone Virtual Local Area Network (B-VLAN) identity (ID) and a Service Instance TAG (I-TAG) into the header of the message. The forwarding path between the source device and the destination device of the CE is statically configured in advance, and the in-between CE device can forward the data frame based on the B-DA and B-VID in the forwarding list, of which the forwarding efficiency is high.

Figure 1:
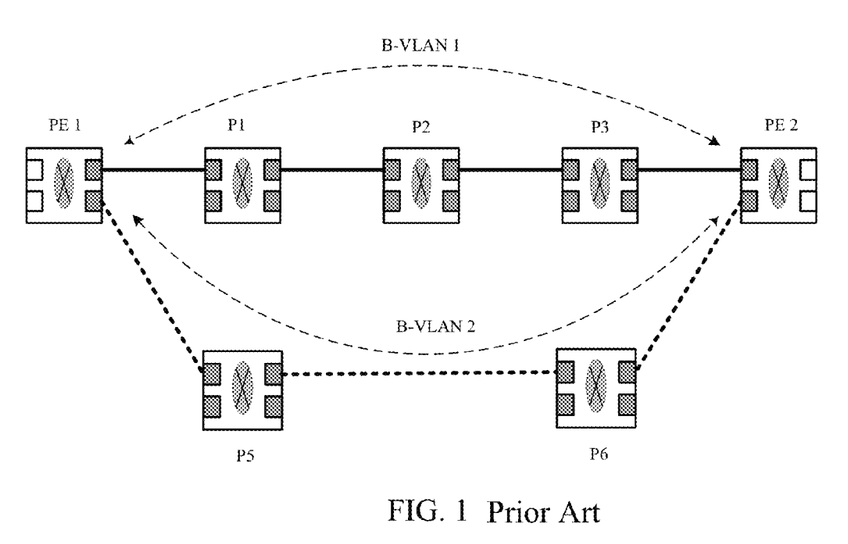
FIG. 1 is a schematic diagram 1 of the principle of end to end tunnel protection of the PBB-TE in the prior art.

In order to make the Ethernet achieve the carrier-grade standard, the PBB-TE usually uses the protection technique. FIG. 1 shows a schematic diagram 1 of the end to end tunnel protection principle of PBB-TE in the prior art, wherein the end to end primary tunnel of a certain traffic engineering service instance is TN 1: PE 1← →P1← →P2← →P3← →PE 2, and PE1 and PE2 are ends of this tunnel instance; TN2: PE 1← →P5← →P6← →PE 2 is an end to end secondary tunnel of this traffic engineering service instance, and in order to differentiate the above primary tunnel TN1 and the secondary tunnel TN2, B-VLAN1 is specified for the primary tunnel TN1 and B-VLAN2 is specified for the secondary tunnel TN2 during the pre-configuration. When a fault occurs in the end to end primary tunnel TN1, the data stream can be switched into the secondary tunnel TN2.

The PBB-TE uses the Connectivity Fault Management (CFM) mechanism in the IEEE 802.1ag to continuously monitor the tunnel state in the network. When the primary tunnel fails, the service is automatically switched into the secondary tunnel established in advance, which implements the tunnel protection technique.

Figure 2:
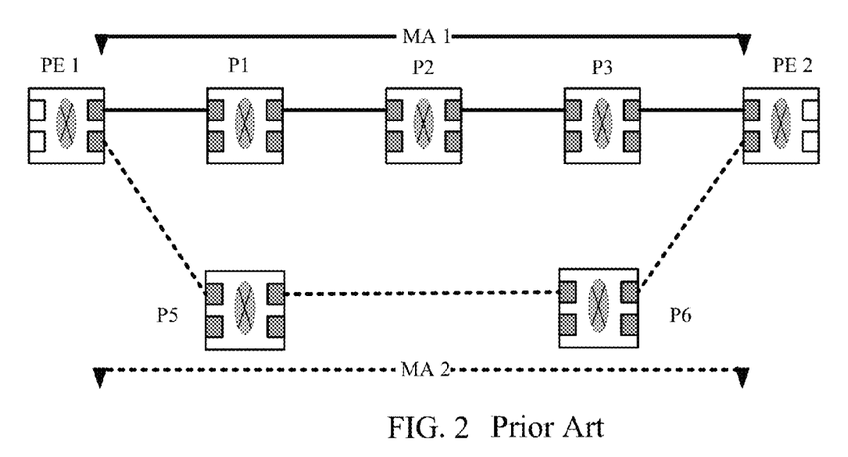
FIG. 2 is a schematic diagram 2 of the principle of end to end tunnel protection of the PBB-TE in the prior art.

In the prior art, the tunnel continuity is detected by sending the Continuity Check Message (CCM) defined in the IEEE 802.1ag in the tunnel. As shown in FIG. 2, the tunnel ends PE1 and PE2 respectively send the CCM to each other along with the primary tunnel TN1 and the secondary tunnel TN2, the primary tunnel and the secondary tunnel respectively belong to the different Maintenance Associations (MA), the primary tunnel belongs to MA1, the secondary tunnel belongs to MA2, and CCMs of the primary tunnel and the secondary tunnel respectively encapsulates the ID of the B-VLAN1 and the ID of the B-VLAN2. This method implements the full path protection of the tunnel.

Figure 3:
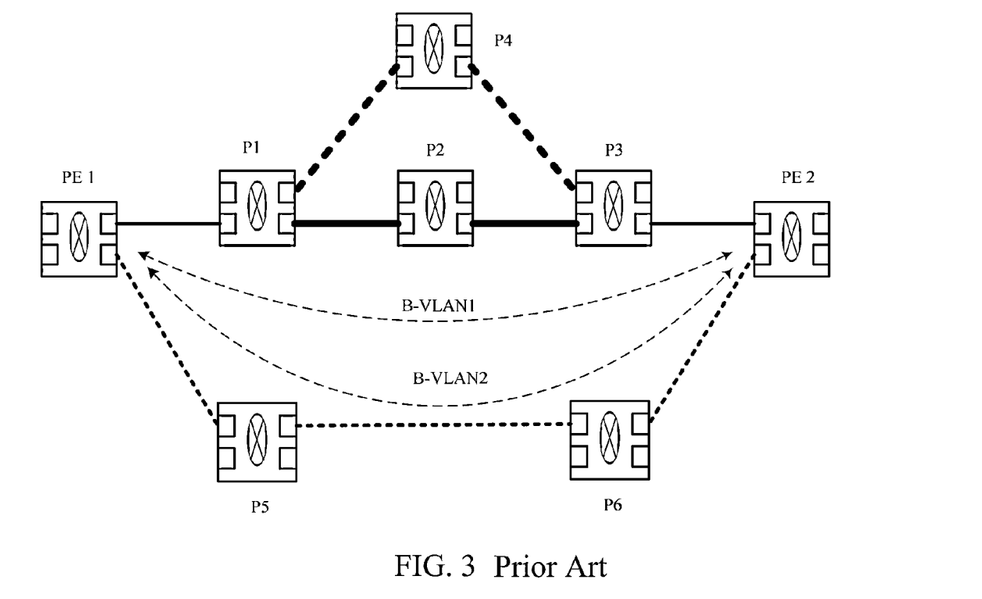
FIG. 3 is a schematic diagram 1 of the segment protection principle in the prior art.

Although the end to end protection technique of the PBB-TE is able to efficiently protect the tunnel, this end to end protection scheme not only has a longer protection switching time, but also involves too many nodes. Therefore, the IEEE organization proposes the protection scheme of the PBB-TE. As shown in FIG. 3, P1-P2-P3 is a physical link bearing a path of the end to end primary tunnel TN1 (PE 1← →P1← →P2← →P3← →PE 2), and the physical link is called as the segment in the following text. The secondary segment (P1-P4-P3) can be used for the protection. The main difference of the segment protection scheme of the PBB-TE and the end to end protection of the PBB-TE is that: the segment protection scheme is on the basis of the protection of the physical link, whereas the end to end protection scheme is on the basis of the protection of the tunnel.

Figure 4:
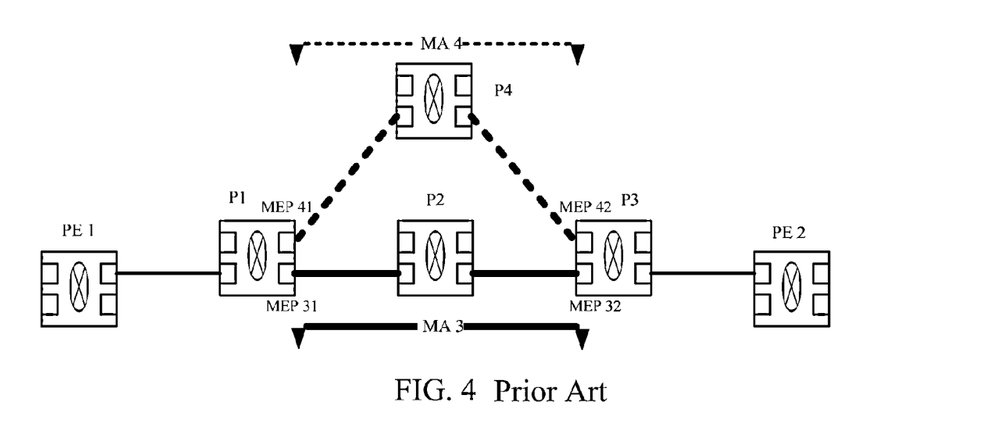
FIG. 4 is a schematic diagram 2 of the segment protection principle in the prior art.

In order to implement the segment protection function of the PBB-TE, the integrity of the CCM messages are required to be verified on the primary segment and the secondary segment of the segment protection domain at the same time. As shown in FIG. 4, the ends P1 and P3 respectively send CCMs to each other along with the primary segment (P1-P2-P3) and the secondary segment (P1-P4-P3), the primary segment belongs to MA3, the secondary segment belongs to MA4, and the CCMs of the primary segment and the secondary segment respectively encapsulates the corresponding IDs of the B-VLANs. This method implements the good protection for the path (the physical path) of the tunnel.

Figure 5:
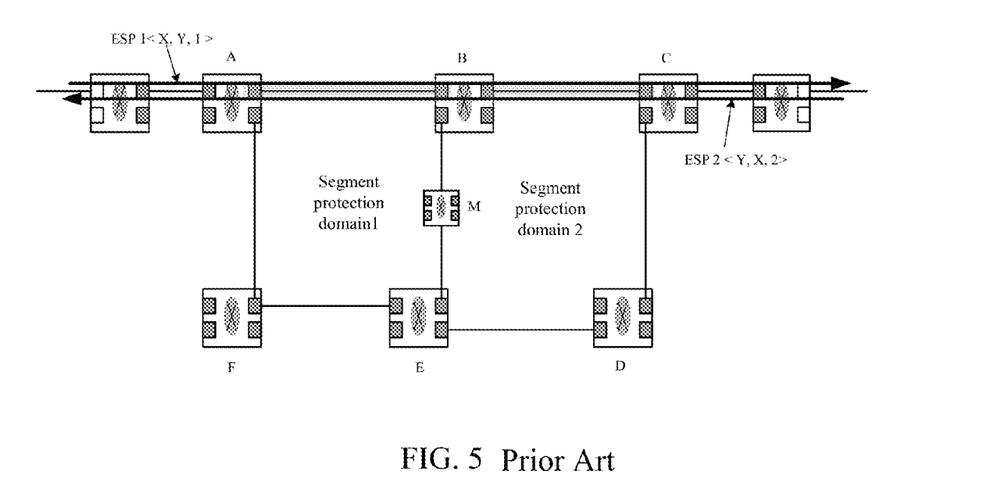
FIG. 5 is a schematic diagram of the topology structure of the multiple segment protection domains with the shared link in the prior art.

The case that there is a shared link between the segment protection domains of the PBB-TE is a hot topic discussed in the current segment protection. The segment protection domain is the segment protection domain of the tunnel (Ethernet Switched Path, ESP), as shown in FIG. 5, the segment protection domain 1 formed by the segment A-B-M-E-F-A, which is also called the first segment protection domain, and the segment protection domain 2 formed by the segment C-B-M-E-D-C, which is also called [as] the second segment protection domain, are both the segment protection domains of ESP 1<X, Y, 1> and ESP 2<Y, X, 2> (the attribute of the ESP is marked by the triple of <ESP-DA, ESP-SA, ESP-VID> in the data stream, referring to IEEE 802.1Qay). The segment protection domain 1 and the segment protection domain 2 have the shared path B-M-E. In the segment protection domain 1, the primary segment of ESP1 and ESP2 is A-B, and the secondary segment is A-F-E-M-B; in the segment protection domain 2, the primary segment of ESP1 and ESP2 is C-B, and the secondary segment is C-D-E-M-B.

Figure 6:
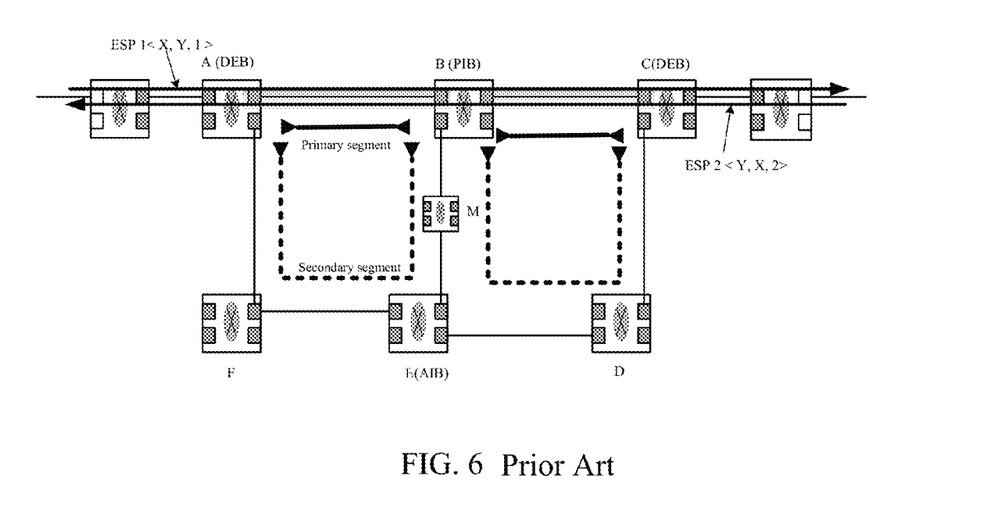
FIG. 6 is a schematic diagram of the fault detection mechanism of multiple segment protection domains with the shared link in the prior art.

In order to implement the above segment protection function with the shared link topology, the prior art provides a solution. As shown in FIG. 6, in order to perform the segment protection on ESP 1 and ESP 2, the Primary Interconnecting Bridge (PIB) node and the Alternate Interconnecting Bridge (AIB) node are configured on the shared path B-M-E, the node B is the PIB node, and the node E is the AIB node. Domain Endpoint Bridge (DEB) nodes are configured in the segment protection domain 1 and the segment protection domain 2, and the node A and node C are both the DEB nodes.

Figure 7:
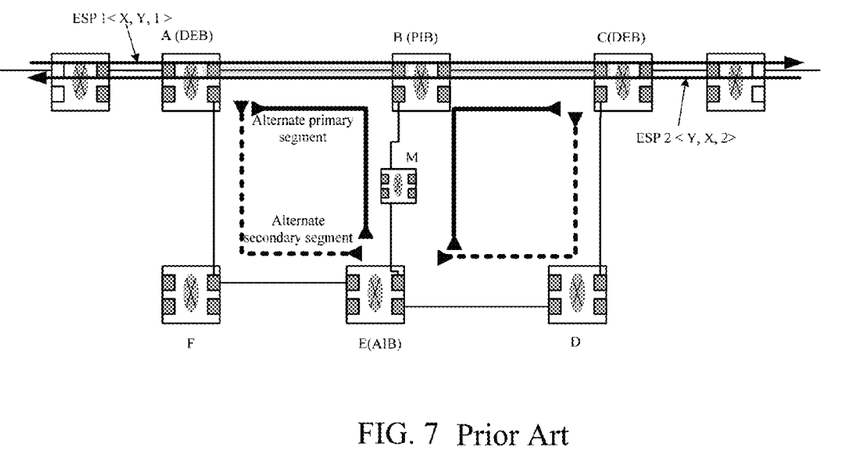
FIG. 7 is a schematic diagram of the fault detection mechanism of multiple segment protection domains with the shared link in the prior art.

As shown in FIG. 6 and FIG. 7, in the segment protection domain 1, the node A (DEB) and the node B (PIB) respectively send the CCM messages on the primary segment (A-B) and the secondary segment (A-F-E-M-B), so as to detect whether the primary segment and secondary segment are normal; the node A (DEB) and the node E (AIB) respectively send the CCM messages on the alternate primary segment and the alternate secondary segment, so as to detect whether the alternate primary segment (A-B-M-E) and alternate secondary segment (A-F-E) are normal. Similarly, in the segment protection domain 2, the node C (DEB) and the node B (PIB) respectively send the CCM messages on the primary segment (C-B) and the secondary segment (C-D-E-M-B), so as to detect whether the primary segment and secondary segment are normal; the node C (DEB) and the node E (AIB) respectively send the CCM messages on the alternate primary segment and the alternate secondary segment, so as to detect whether the alternate primary segment (C-B-M-E) and alternate secondary segment (C-D-E) are normal.

The DEB node only detects the primary segment and the secondary segment in the segment protection domain to which this DEB node belongs, but is not responsible for detecting the alternate primary segment and the alternate secondary segment; the PIB detects the primary segments and the secondary segments in two segment protection domains to which this PIB belongs at the same time; the AIB detects the alternate primary segments and the alternate secondary segments in two segment protection domains to which this AIB belongs at the same time.

Figure 8:
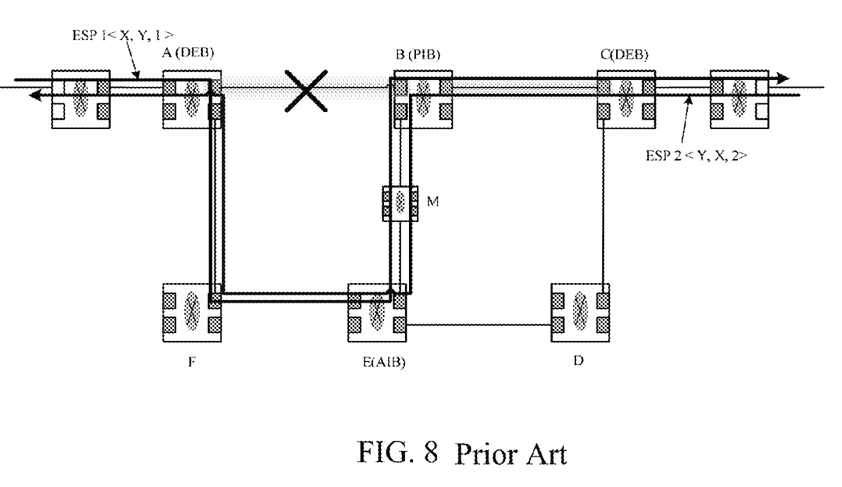
FIG. 8 is a schematic diagram of the segment protection structure in the case of the single node fault in the prior art.

As shown in FIG. 8, if a fault occurs on a link between the nodes A and B, the node A (DEB) does not receive the CCM message sent on the primary segment from the node B (PIB) in certain duration, then, see FIG. 6, the node A will switch all the tunnels, for example ESP 1, originally transmitted on the primary segment (A-B) into the secondary segment (A-F-E-M-B). Similarly, the node B (PIB) does not receive the CCM message sent on the primary segment from the node A (DEB) in certain duration either, then, see FIG. 6, the node B will switch all the tunnels, for example ESP 2, originally transmitted on the primary segment (B-A) into the secondary segment (B-M-E-F-A). Finally, the newest paths of the ESP 1 and ESP 2 in two segment protection domains with the shared link respectively become [to] A-F-E-M-B-C and C-B-M-E-F-A.

Figure 9:
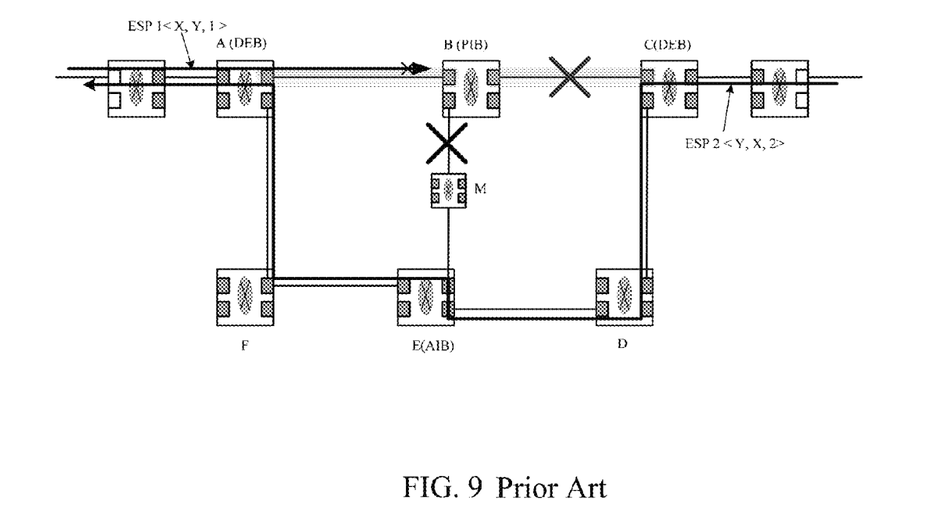
FIG. 9 is a schematic diagram of the segment protection structure in the case of the multi-node fault in the prior art.

Although the above main mechanism of the DEB node, PIB node and AIB node is able to solve a majority of problems quite well, the fault is unable to be detected in certain cases, thereby causing the interruption of the communication in long duration. The specific example is as follows:

As shown in FIG. 9, the shared link <B, M> and the link <B, C> of the segment protection domain 2 both have the fault. In the segment protection domain 2, the node C (DEB) does not receive the CCM message sent on the primary segment from the node B (PIB) in certain duration, and the node C will switch all the tunnels, for example ESP 2, on the primary segment of the segment protection domain 1 into the secondary segment; the node E (AIB) does not receive the CCM message sent on the alternate primary segment from the node A (DEB) in certain duration, the node E will switch all the tunnels, for example ESP 2, on the alternate primary segment into the alternate backup segment; therefore, the path of the ESP 2 in segment protection domain 1 and segment protection domain 2 changes into C-D-E-F-A, and the data message can be transmitted normally. However, in segment protection domain 1, since the node A (DEB) is able to receive the CCM message sent on the primary segment from the node B (PIB) in a certain period, the node A will not switch all the tunnels, for example ESP 1, originally transmitted on the primary segment (A-B) into the secondary segment. However, since the shared link <B, M> and link <B, C> both have the fault, therefore, all the data messages in the ESP 1 will be discarded after reaching the node B, thereby causing the interruption of the communication in long duration.

It can be seen from the above analysis that the solution in the prior art will allow the occurrence of the case of severe communication interruption in certain cases, and a new mechanism is required to solve this problem. Therefore, in the segment protection domain with the shared link, it will be quite meaningful to propose a new joint detection scheme to overcome the above drawback.

SUMMARY OF THE INVENTION

In view of this, the main object of the present invention is to provide a method and a system for joint detection of Ethernet segment protection, which is able to implement segment protection in the case of the multi-node fault and improve the network performance.

In order to achieve the above object, the technical scheme of the present invention is implemented in this way:

The present invention provides a method for detection of Ethernet segment protection, and this method comprises:

configuring a detection point in two segment protection domains with a shared link;

configuring a joint monitor group on the shared link of said two segment protection domains; and performing fault detection on a detected segment according to whether the configured detection point and joint monitor group receive a Continuity Check Message (CCM) in a certain period;

thereby implementing joint detection of the Ethernet segment protection by configuring the joint monitor group.

In the above technical scheme, said two segment protection domains are a first segment protection domain and a second segment protection domain respectively;

said two segment protection domains both comprise:

a primary segment, a secondary segment, an alternate primary segment and an alternate secondary segment; and a Domain Endpoint Bridge (DEB) node, and a Primary Interconnecting Bridge (PIB) node and an Alternate Interconnecting Bridge (AIB) node which are configured on the shared link;

said detection point is configured on said DEB node, PIB node and AIB node.

In the above technical scheme, the step of configuring the joint monitor group comprises: configuring three ports of the PIB node on said shared link in two segment protection domains as the joint monitor group, and configuring three ports of the AIB node on said shared link in two segment protection domains as the joint monitor group.

Wherein the step of performing fault detection on the detected segment according to whether the configured detection point and joint monitor group receive the CCM message in the certain period comprises: judging whether the detected segment has a fault according to the following steps via the DEB node:

A1, judging whether the DEB node in the first segment protection domain/the second segment protection domain receives the CCM messages sent on the primary segment and the secondary segment from the PIB node in the certain period, if the CCM messages sent on the primary segment and the secondary segment from the PIB node are both received or are both not received, the DEB node not performing a tunnel switching action, but continuing to perform fault detection work via the DEB node; if the CCM message sent on the primary segment/the secondary segment from the PIB node is not received but the CCM message sent on the secondary segment/the primary segment from the PIB node is received, then performing step A2; and A2, said DEB node switching a tunnel on the primary segment/the secondary segment into the secondary segment or the primary segment, and then continuing to perform the fault detection work via the DEB node.

Wherein the step of performing fault detection on the detected segment according to whether the configured detection point and joint monitor group receive the CCM messages in the certain period comprises: judging whether the detected segment has a fault according to the following steps via the PIB node:

B1, judging whether the PIB node receives the CCM messages sent on the primary segment and the secondary segment from the DEB nodes in the first segment protection domain and the second segment protection domain in a certain period, if the CCM messages sent on the primary segment and the secondary segment from the DEB nodes in the first segment protection domain and the second segment protection domain are both received or are both not received, then the PIB node not performing the tunnel switch action, but continuing to perform the fault detection work via the PIB node;

if the PIB node does not receive the CCM message sent on the primary segment/the secondary segment from the DEB node in the first segment protection domain/the second segment protection domain but receives the CCM message sent on the secondary segment or the primary segment from the DEB node, then performing step B2;

if the port of the PIB node on the shared link does not receive the CCM message sent on the secondary segment from the DEB node in the first segment protection domain and the second segment protection domain and the port of the PIB node in the first segment protection domain/the second segment protection domain does not receive the CCM message sent on the primary segment from the DEB node in this segment protection domain either, then performing step B3;

B2, the PIB node switching the tunnel on the primary segment/the secondary segment in the first segment protection domain/the second segment protection domain into the secondary segment/the primary segment, and then continuing to perform the fault detection work via the PIB node;

B3, the port of the PIB node in the second segment protection domain/the first segment protection domain stopping sending the CCM message on the primary segment to the DEB node in said second segment protection domain/the first segment protection domain; the DEB node not receiving the CCM message sent on the primary segment from the PIB node in a certain period, and then the DEB node switching the tunnel on the primary segment in the second segment protection domain/the first segment protection domain into the secondary segment, and then continuing to perform the fault detection work via the DEB node.

Wherein the step of performing fault detection on the detected segment according to whether the configured detection point and joint monitor group receive the CCM message in the certain period comprises: judging whether the detected segment has a fault according to the following steps via the AIB node:

C1, judging whether the AIB node receives the CCM messages sent on the alternate primary segment and the alternate secondary segment from the DEB node in the first segment protection domain and the second segment protection domain in a certain period, if the CCM messages sent on the alternate primary segment and the alternate secondary segment from the AIB node in the first segment protection domain and the second segment protection domain are both received or are both not received, then the AIB node not performing the tunnel switching action, but continuing to perform the fault detection operation via the AIB node;

if the AIB node does not receive the CCM message sent on the alternate primary segment/the alternate secondary segment from the DEB node in the first segment protection domain/the second segment protection domain but receives the CCM message sent on the alternate secondary segment/ the alternate primary segment from the DEB node, then performing step C2;

if the port of the AIB node on the shared link does not receive the CCM message sent on the alternate primary segment from the DEB node in the first segment protection domain and the second segment protection domain and the port of the AIB node in the first segment protection domain/ the second segment protection domain does not receive the CCM message sent on the alternate secondary segment from the DEB node in this segment protection domain either, then performing step C3;

C2, the AIB node switching the tunnel on the alternate primary segment/the alternate secondary segment in the first segment protection domain/the second segment protection domain into the alternate secondary segment/the alternate primary segment, and then continuing to perform the fault detection work via the AIB node;

C3, the port of the AIB node in the second segment protection domain/the first segment protection domain stopping sending the CCM message on the alternate secondary segment to the DEB node in the second segment protection domain/the first segment protection domain; the DEB node not receiving the CCM message sent on the alternate secondary segment from the AIB node in a certain period, and then the DEB node switching the tunnel on the alternate secondary segment in the second segment protection domain/the first segment protection domain into the alternate primary segment, and then continuing to perform the fault detection work via the DEB node.

Wherein said CCM message includes: a source media access control (MAC) address of the detected segment and a destination MAC address of the detected segment.

The present invention also provides a system for detection of Ethernet segment protection, this system comprising a detection point configuration unit, a joint monitor group configuration unit and a judgment unit, wherein:

the detection point configuration unit is configured to configure a detection point in two segment protection domains with a shared link;

the joint monitor group configuration unit is configured to configure a joint monitor group on the shared link of said two segment protection domains; and the judgment unit is configured to perform fault detection on a detected segment according to whether the configured detection point and joint monitor group receive a Continuity Check Message (CCM) in a certain period, thereby implementing joint detection of the Ethernet segment protection.

In the above technical scheme, said two segment protection domains are a first segment protection domain and a second segment protection domain respectively;

said two segment protection domains both comprise:

a primary segment, a secondary segment, an alternate primary segment and an alternate secondary segment; and a DEB node, and a PIB node and an AIB node which are configured on the shared link;

said detection point configuration unit is configured to configure detection points on said DEB node, PIB node and AIB node.

In the above technical scheme, said joint monitor group configuration unit is configured to configure three ports of the PIB node on said shared link in two segment protection domains as the joint monitor group, and configure three ports of the AIB node on said shared link in two segment protection domains as the joint monitor group.

Compared with the prior art, the method and the system of the present invention increases the joint monitor based on the existing node detection by configuring the joint monitor group in the PIB node and AIB node of the shared link of two segment protection domains in the Ethernet. The method and the system for joint detection of the present invention solve the problem of the segment protection in the case of the multi-node fault quite well and greatly improve the network performance.

PREFERRED EMBODIMENTS OF THE PRESENT INVENTION

The basic idea of the present invention is: to increase the joint monitor based on the existing node detection by configuring the joint monitor group in the PIB node and AIB node of the shared link of two segment protection domains in the Ethernet, which solves the problem of the segment protection in the case of the multi-node fault quite well and greatly improves the network performance.

A joint monitor group is configured in the segment protection domain 1 and the segment protection domain 2 with the shared link, which is specifically as follows:

a joint monitor group is configured on a PIB node in a shared link, namely, three ports of the PIB node in two segment protection domains are configured as a joint monitor group. If the port of the PIB node on the shared link does not receive the CCM message sent from the DEB nodes of the two segment protection domains in a certain period and the port of the PIB node on the primary segment of the segment protection domain 2/the segment protection domain 1 does not receive the CCM message sent from the DEB node in the segment protection domain 2/the segment protection domain 1 in the certain period either, then the port of the PIB node on the primary segment of the segment protection domain 1/the segment protection domain 2 stops sending the CCM message to the DEB node in the segment protection domain 1/the segment protection domain 2. Thus, since the DEB node in the segment protection domain 1/the segment protection domain 2 does not receive the CCM message sent on the primary segment from the PIB node in a certain period, the DEB node in the segment protection domain 1/the segment protection domain 2 switches the tunnel on the primary segment in this protection domain to the secondary segment.

A joint monitor group is configured on an AIB node in a shared link, namely, three ports of the AIB node in two segment protection domains are configured as a joint monitor group. If the port of the AIB node on the shared link does not receive the CCM message sent from the DEB nodes in the two segment protection domains in a certain period and the port of the AIB node on the alternate secondary segment of the segment protection domain 1/the segment protection domain 2 does not receive the CCM message sent from the DEB node in the segment protection domain 1/the segment protection domain 2 in the certain period either, then the port of the AIB node on the alternate secondary segment of the segment protection domain 2/the segment protection domain 1 stops sending the CCM message to the DEB node in the segment protection domain 2/the segment protection domain 1. Thus, the DEB node in the segment protection domain 2/the segment protection domain 1 switches the tunnel on the alternate secondary segment to the alternate primary segment.

Other operation functions of the DEB node, AIB node and PIB node are the same with those in the prior art and other operation functions comprise:

the DEB node only detects the primary segment and the secondary segment in the segment protection domain to which the DEB node belongs, whereas the DEB node is not in charge of monitoring the alternate primary segment and the alternate secondary segment. If the DEB node on the primary segment/the secondary segment in a certain segment protection domain does not receive the CCM message sent from the PIB node in a certain period, then said DEB node switches the tunnel on the primary segment/the secondary segment in this segment protection domain into the secondary segment/the primary segment;

the PIB node detects the primary segments and secondary segments in two segment protection domains at the same time. If the PIB node on the primary segment/the secondary segment in a certain segment protection domain does not receive the CCM message sent from the DEB node in this segment protection domain in a certain period, then said PIB node switches the tunnel on the primary segment/the secondary segment in this segment protection domain into the secondary segment/the primary segment;

the AIB node detects the alternate primary segment and alternate secondary segment in two segment protection domains at the same time. If the PIB node on the alternate primary segment/the alternate secondary segment in a certain segment protection domain does not receive the CCM message sent from the DEB node in a certain period, then said PIB node switches the tunnel on the alternate primary segment/the secondary segment in this segment protection domain into the alternate secondary segment/the alternate primary segment.

Figure 10:
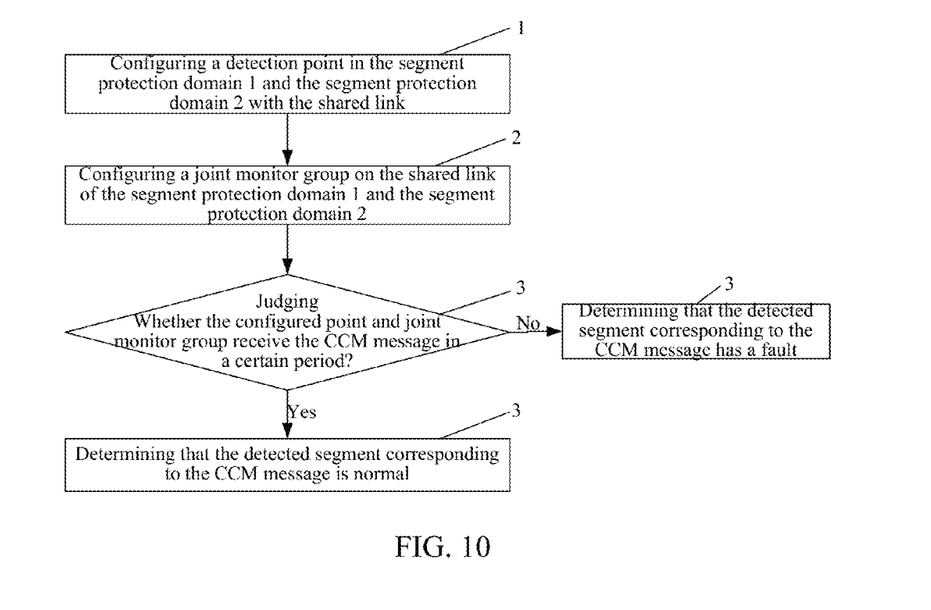
FIG. 10 is a schematic diagram of the implementation flow of the method for joint detection of the Ethernet segment protection according to the present invention.

The present invention provides a method for joint detection of Ethernet segment protection. FIG. 10 is a schematic diagram of the implementation flow of the method for joint detection of the Ethernet segment protection according to the present invention, and as shown in FIG. 10, this method for joint detection comprises the following steps:

step 1, a detection point is configured in the segment protection domain 1 and the segment protection domain 2 with the shared link;

in this step, the detection point is configured on the DEB node and the PIB node in each segment protection domain, and the detection points of the DEB node and the PIB node on the primary segment and the secondary segment respectively belong to different MAs; the detection point is configured in the DEB node and the AIB node in each segment protection domain, and the detection points of the DEB node and the AIB node on the alternate primary segment and the alternate secondary segment respectively belong to different maintenance associations.

In this step, two detection points of the same maintenance association respectively send the CCM message to each other on the segments which are managed by these two detection points.

Step 2, a joint monitor group is configured on the shared link of the segment protection domain 1 and the segment protection domain 2;

in this step, the three ports of the PIB node on the shared link in two segment protection domains are configured as the joint monitor group, and the three ports of the AIB node in the two segment protection domains are configured as the joint monitor group.

Step 3, it is judged whether the configured detection point and joint monitor group receive the CCM message in a certain period, and if the CCM message is received, then it is determined that the detected segment corresponding to the CCM message is normal; if the CCM message is not received, then it is determined that the detected segment corresponding to the CCM message has a fault;

in this step, whether the detected segment corresponding to the CCM message has a fault is determined by judging whether the DEB node, PIB node and AIB node receive the CCM message in a certain period, wherein the CCM message includes the source MAC address and the destination MAC address of the detected segment.

In step 3, determining whether the detected segment has a fault via the DEB node, PIB node and AIB node particularly comprises:

1) determining whether the detected segment has a fault via the DEB node:

step 11, it is judged whether the DEB in the segment protection domain 1/the segment protection domain 2 receives the CCM messages sent from the detection points of the PIB node on the primary segment and the secondary segment, and if the CCM messages sent on the primary segment and the secondary segment from the PIB node are both received or are both not received, the DEB node does not perform the tunnel switching action, but continues to perform the fault detection work via the DEB node; if the CCM message sent on the primary segment/the secondary segment from the PIB node is not received but the CCM message sent on the secondary segment/the primary segment from the PIB node is received, then step 12 is performed;

step 12, the DEB node switches the related tunnel on the primary segment/the secondary segment in the segment protection domain 1/the segment protection domain 2 into the secondary segment/the primary segment, and then continues to perform the fault detection work via the DEB node.

2) determining whether the detected segment has a fault via the PIB node:

step 21, it is judged whether the PIB node receives the CCM messages sent on the primary segment and the secondary segment from the DEB nodes in the segment protection domain 1/the segment protection domain 2 in a certain period, if the CCM messages sent on the primary segment and the secondary segment from the DEB node in the segment protection domain 1/the segment protection domain 2 are both received or are both not received, then the PIB node does not perform the tunnel switching action, but continues to perform the fault detection work via the PIB node;

if the PIB node does not receive the CCM message sent on the primary segment/the secondary segment from the DEB node in the segment protection domain 1/the segment protection domain 2 but receives the CCM message sent on the secondary segment/the primary segment from the DEB node, then step 22 is performed;

if the port of PIB node on the shared link does not receive the CCM message sent on the secondary segment from the DEB node in the segment protection domain 1 and the segment protection domain 2 and the port of the PIB node in the segment protection domain 1/the segment protection domain 2 does not receive the CCM message sent on the primary segment from the DEB node in this segment protection domain either, then step 23 is performed;

step 22, the PIB node switches the related tunnel on the primary segment/the secondary segment in the segment protection domain 1/the segment protection domain 2 into the secondary segment/the primary segment;

step 23, the port of the PIB node in the segment protection domain 2/the segment protection domain 1 stops sending the CCM message on the primary segment to the DEB node in the segment protection domain 2/the segment protection domain 1. The DEB node does not receive the CCM message sent on the primary segment from the PIB node in a certain period, and then the DEB node switches the related tunnel on the primary segment in this segment protection domain into the secondary segment, and then continues to perform the fault detection work via the DEB node;

3) determining whether the detected segment has a fault via the AIB node:

step 31, it is judged whether the AIB node receives the CCM messages sent on the alternate primary segment and the alternate secondary segment from the DEB node in the segment protection domain 1 and the segment protection domain 2 in a certain period, if the CCM messages sent on the alternate primary segment and the alternate secondary segment from the AIB node in the segment protection domain 1 and the segment protection domain 2 are both received or are both not received, then the AIB node does not perform the ESP switching action, but continues to perform the fault detection work via the AIB node;

if the AIB node does not receive the CCM message sent on the alternate primary segment/the alternate secondary segment from the DEB node in the segment protection domain 1/the segment protection domain 2 but receives the CCM message sent on the alternate secondary segment/the alternate primary segment from the DEB node, then step 32 is performed;

if the port of the AIB node on the shared link does not receive the CCM message sent on the alternate primary segment from the DEB node in the segment protection domain 1 and the segment protection domain 2 and the port of the AIB node in the segment protection domain 1/the segment protection domain 2 does not receive the CCM message sent on the alternate secondary segment from the DEB node in this segment protection domain either, then step 33 is performed;

step 32, the AIB node switches the related tunnel on the alternate primary segment/the alternate secondary segment in the segment protection domain 1/the segment protection domain 2 into the alternate secondary segment/the alternate primary segment, and then continues to perform the fault detection work via the AIB node;

step 33, the port of the AIB node in the segment protection domain 2/the segment protection domain 1 stops sending the CCM message on the alternate secondary segment to the DEB node in the segment protection domain 2/the segment protection domain 1. The DEB node does not receive the CCM message sent on the alternate secondary segment from the AIB node in a certain period, and then the DEB node switches the related tunnel on the alternate secondary segment in this segment protection domain into the alternate primary segment, and then continues to perform the fault detection work via the DEB node.

Below the method for joint detection of the Ethernet segment protection according to the present invention is specifically described with reference to drawings and examples.

EXAMPLE 1

This example takes the case shown in FIG. 9 in the prior art as an example to further describe the method for joint detection of the Ethernet segment protection according to the present invention in the case of the multi-node fault.

Figure 11:
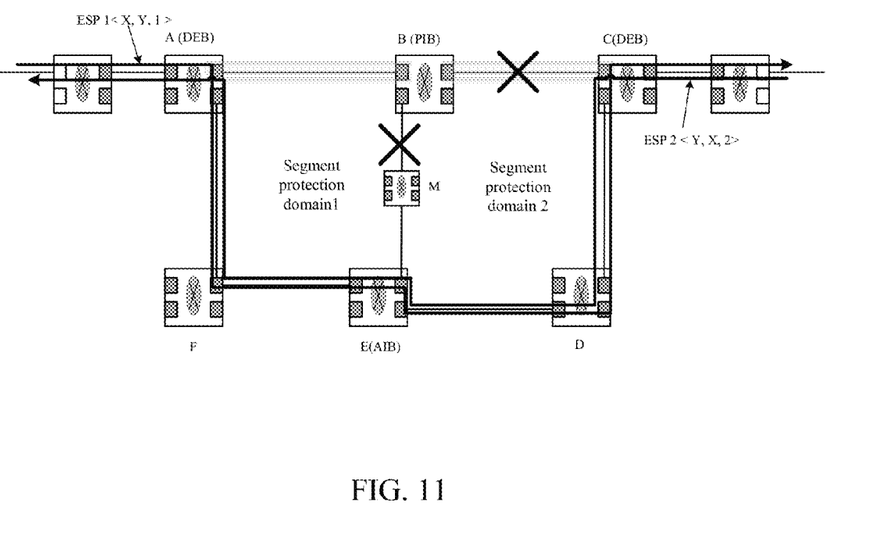
FIG. 11 is a schematic diagram of the segment protection structure in the case of the multi-node fault according to the present invention.

FIG. 11 is a schematic diagram of the segment protection structure in the case of the multi-node fault according to the present invention. As shown in FIG. 11, the node E (AIB) does not receive the CCM message sent on the alternate primary segment from the node A (DEB) in a certain period, and the node E switches all the tunnels, for example the ESP2, on the alternate primary segment into the alternate secondary segment; in the segment protection domain 2, the node C (DEB) does not receive the CCM message sent on the primary segment from the node B (PIB) to the node C in a certain period, and the node C switches all the tunnels, for example the ESP2, on the primary segment into the secondary segment. Thus, the path of the ESP2 in the segment protection domain 1 and the segment protection domain 2 changes into: C-D-E-F-A.

Besides, a joint monitor group is established on three ports of the node B (PIB). Since the port of the node B (PIB) on the shared link is unable to receive the CCM message sent from the DEB node of the segment protection domain 1 and the segment protection domain 2 (the shared link <B, M> has a fault) and is unable to receive the CCM message sent on the primary segment of the segment protection domain 2 from the DEB node either (the link <B, C> has a fault), thus the node B (PIB) stops sending the CCM message on the primary segment of the segment protection domain 1 to the node A (DEB) in this segment protection domain. The node A (DEB) does not receive the CCM message sent on the primary segment from the node B (PIB) in a certain period, and the node A will switch the tunnel, for example ESP1, on the primary segment into the secondary segment. Thus, the path of the ESP1 in the segment protection domain 1 and the segment protection domain 2 changes into A-F-E-D-C. Therefore, all the data messages in the ESP1 will be transmitted successfully, thereby maintaining the smooth communication.

The present invention further provides a system for implementing the above method for joint detection of Ethernet segment protection, and this system comprises: a detection point configuration unit, a joint monitor group configuration unit, and a judgment unit; which are specifically:

the detection point configuration unit is used for configuring a detection point in two segment protection domains with a shared link;

the joint monitor group configuration unit is used for configuring a joint monitor group in the shared link of two segment protection domains;

the judgment unit is used for judging whether the configured detection point and joint monitor group receive a CCM message in a certain period; when the CCM message is received, the judgment unit determines a detected segment corresponding to this CCM message is normal; when the CCM message is not received, the judgment unit determines a detected segment corresponding to this CCM message has a fault.

Based on the above analysis, the present invention solves the segment protection problem in the case of the multi-node fault quite well, and greatly improves the network performance.

The above description is only preferred examples of the present invention, but is not for limiting the protection scope of the present invention.

INDUSTRIAL APPLICABILITY

Compared with the prior art, the method and the system of the present invention increases the joint monitor based on the existing node detection by configuring the joint monitor group in the PIB node and AIB node of the shared link of two segment protection domains in the Ethernet. The method and the system for joint detection of the present invention solve the problem of the segment protection in the case of the multi-node fault quite well and greatly improve the network performance.

What is claimed is:

1. A method for detection of Ethernet segment protection, this method comprising:
    configuring a detection point in two segment protection domains with a shared link;
    configuring a joint monitor group on the shared link of said two segment protection domains; and
    performing fault detection on a detected segment according to whether the configured detection point and joint monitor group receive a Continuity Check Message (CCM) in a certain period;
    thereby implementing joint detection of the Ethernet segment protection by configuring the joint monitor group;
    wherein, said two segment protection domains are a first segment protection domain and a second segment protection domain respectively; said two segment protection domains both comprise: a primary segment, a secondary segment, an alternate primary segment and an alternate secondary segment, and a Domain Endpoint Bridge (DEB) node, and a Primary Interconnecting Bridge (PIB) node and an Alternate Interconnecting Bridge (AIB) node which are configured on the shared link; and said detection point is configured on said DEB node, PIB node and AIB node;
    wherein, the step of configuring the joint monitor group comprises: configuring three ports of the PIB node on said shared link in two segment protection domains as the joint monitor group, and configuring three ports of the AIB node on said shared link in two segment protection domains as the joint monitor group;
    wherein, the step of performing fault detection on the detected segment according to whether the configured detection point and joint monitor group receive the CCM message in the certain period comprises: judging whether the detected segment has a fault according to the following steps via the DEB node:

A1, judging whether the DEB node in the first segment protection domain/the second segment protection domain receives the CCM messages sent on the primary segment and the secondary segment from the PIB node in the certain period, if the CCM messages sent on the primary segment and the secondary segment from the PIB node are both received or are both not received, the DEB node not performing a tunnel switching action, but continuing to perform fault detection work via the DEB node; if the CCM message sent on the primary segment/the secondary segment from the PIB node is not received but the CCM message sent on the secondary segment/the primary segment from the PIB node is received, then performing step A2; and A2, said DEB node switching a tunnel on the primary segment/the secondary segment into the secondary segment or the primary segment, and then continuing to perform the fault detection work via the DEB node.

2. The method for detection of claim 1, wherein the step of performing fault detection on the detected segment according to whether the configured detection point and joint monitor group receive the CCM messages in the certain period comprises: judging whether the detected segment has a fault according to the following steps via the PIB node:

B1, judging whether the PIB node receives the CCM messages sent on the primary segment and the secondary segment from the DEB nodes in the first segment protection domain and the second segment protection domain in a certain period, if the CCM messages sent on the primary segment and the secondary segment from the DEB nodes in the first segment protection domain and the second segment protection domain are both received or are both not received, then the PIB node not performing the tunnel switch action, but continuing to perform the fault detection work via the PIB node;

if the PIB node does not receive the CCM message sent on the primary segment/the secondary segment from the DEB node in the first segment protection domain/the second segment protection domain but receives the CCM message sent on the secondary segment or the primary segment from the DEB node, then performing step B2;

if the port of the PIB node on the shared link does not receive the CCM message sent on the secondary segment from the DEB node in the first segment protection domain and the second segment protection domain and the port of the PIB node in the first segment protection domain/the second segment protection domain does not receive the CCM message sent on the primary segment from the DEB node in this segment protection domain either, then performing step B3;

B2, the PIB node switching the tunnel on the primary segment/the secondary segment in the first segment protection domain/the second segment protection domain into the secondary segment/the primary segment, and then continuing to perform the fault detection work via the PIB node;

B3, the port of the PIB node in the second segment protection domain/the first segment protection domain stopping sending the CCM message on the primary segment to the DEB node in said second segment protection domain/the first segment protection domain; the DEB node not receiving the CCM message sent on the primary segment from the PIB node in a certain period, and then the DEB node switching the tunnel on the primary segment in the second segment protection domain/the first segment protection domain into the secondary segment, and then continuing to perform the fault detection work via the DEB node.

3. The method for detection of claim 2, wherein the step of performing fault detection on the detected segment according to whether the configured detection point and joint monitor group receive the CCM message in the certain period comprises: judging whether the detected segment has a fault according to the following steps via the AIB node:

C1, judging whether the AIB node receives the CCM messages sent on the alternate primary segment and the alternate secondary segment from the DEB node in the first segment protection domain and the second segment protection domain in a certain period, if the CCM messages sent on the alternate primary segment and the alternate secondary segment from the AIB node in the first segment protection domain and the second segment protection domain are both received or are both not received, then the AIB node not performing the tunnel switching action, but continuing to perform the fault detection operation via the AIB node;

if the AIB node does not receive the CCM message sent on the alternate primary segment/the alternate secondary segment from the DEB node in the first segment protection domain/the second segment protection domain but receives the CCM message sent on the alternate secondary segment/the alternate primary segment from the DEB node, then performing step C2;

if the port of the AIB node on the shared link does not receive the CCM message sent on the alternate primary segment from the DEB node in the first segment protection domain and the second segment protection domain and the port of the AIB node in the first segment protection domain/the second segment protection domain does not receive the CCM message sent on the alternate secondary segment from the DEB node in this segment protection domain either, then performing step C3;

C2, the AIB node switching the tunnel on the alternate primary segment/the alternate secondary segment in the first segment protection domain/the second segment protection domain into the alternate secondary segment/the alternate primary segment, and then continuing to perform the fault detection work via the AIB node;

C3, the port of the AIB node in the second segment protection domain/the first segment protection domain stopping sending the CCM message on the alternate secondary segment to the DEB node in the second segment protection domain/the first segment protection domain; the DEB node not receiving the CCM message sent on the alternate secondary segment from the AIB node in a certain period, and then the DEB node switching the tunnel on the alternate secondary segment in the second segment protection domain/the first segment protection domain into the alternate primary segment, and then continuing to perform the fault detection work via the DEB node.

4. The method for the detection of claim 3, wherein said CCM message includes: a source media access control (MAC) address of the detected segment and a destination MAC address of the detected segment.

5. A system for detection of Ethernet segment protection, this system comprising a detection point configuration unit, a joint monitor group configuration unit and a judgment unit, wherein:

the detection point configuration unit is configured to configure a detection point in two segment protection domains with a shared link;

the joint monitor group configuration unit is configured to configure a joint monitor group on the shared link of said two segment protection domains; and the judgment unit is configured to perform faulty detection on a detected segment according to whether the configured detection point and joint monitor group receive a Continuity Check Message (CCM) in a certain period, thereby implementing joint detection of the Ethernet segment protection;

wherein, said two segment protection domains are a first segment protection domain and a second segment protection domain respectively; said two segment protection domains both comprise: a primary segment, a secondary segment, an alternate primary segment and an alternate secondary segment, and a DEB node, and a PIB node and an AIB node which are configured on the shared link; and said detection point configuration unit is configured to configure detection points on said DEB node, PIB node and AIB node;

wherein said joint monitor group configuration unit is further configured to configure three ports of the PIB node on said shared link in two segment protection domains as the joint monitor group, and configure three ports of the AIB node on said shared link in two segment protection domains as the joint monitor group;

wherein said judgment unit is further configured to perform fault detection on the detected segment according to whether the configured detection point and joint monitor group receive the CCM in the certain period in the following way: judging whether the detected segment has a fault according to the following steps via the DEB node:

A1, judging whether the DEB node in the first segment protection domain/the second segment protection domain receives the CCM messages sent on the primary segment and the secondary segment from the PIB node in the certain period, if the CCM messages sent on the primary segment and the secondary segment from the PIB node are both received or are both not received, the DEB node not performing a tunnel switching action, but continuing to perform fault detection work via the DEB node; if the CCM message sent on the primary segment/the secondary segment from the PIB node is not received but the CCM message sent on the secondary segment/the primary segment from the PIB node is received, then performing step A2; and A2, said DEB node switching a tunnel on the primary segment/the secondary segment into the secondary segment or the primary segment, and then continuing to perform the fault detection work via the DEB node.

6. The system for detection of claim 5, wherein said judgment unit is further configured to perform fault detection on the detected segment according to whether the configured detection point and joint monitor group receive the CCM in the certain period in the following way: judging whether the detected segment has a fault according to the following steps via the PIB node:

B1, judging whether the PIB node receives the CCM messages sent on the primary segment and the secondary segment from the DEB nodes in the first segment protection domain and the second segment protection domain in a certain period, if the CCM messages sent on the primary segment and the secondary segment from the DEB nodes in the first segment protection domain and the second segment protection domain are both received or are both not received, then the PIB node not performing the tunnel switch action, but continuing to perform the fault detection work via the PIB node;

if the PIB node does not receive the CCM message sent on the primary segment/the secondary segment from the DEB node in the first segment protection domain/the second segment protection domain but receives the CCM message sent on the secondary segment or the primary segment from the DEB node, then performing step B2;

if the port of the PIB node on the shared link does not receive the CCM message sent on the secondary segment from the DEB node in the first segment protection domain and the second segment protection domain and the port of the PIB node in the first segment protection domain/the second segment protection domain does not receive the CCM message sent on the primary segment from the DEB node in this segment protection domain either, then performing step B3;

B2, the PIB node switching the tunnel on the primary segment/the secondary segment in the first segment protection domain/the second segment protection domain into the secondary segment/the primary segment, and then continuing to perform the fault detection work via the PIB node;

B3, the port of the PIB node in the second segment protection domain/the first segment protection domain stopping sending the CCM message on the primary segment to the DEB node in said second segment protection domain/the first segment protection domain; the DEB node not receiving the CCM message sent on the primary segment from the PIB node in a certain period, and then the DEB node switching the tunnel on the primary segment in the second segment protection domain/the first segment protection domain into the secondary segment, and then continuing to perform the fault detection work via the DEB node.

7. The system for detection of claim 6, wherein said judgment unit is further configured to perform fault detection on the detected segment according to whether the configured detection point and joint monitor group receive the CCM in the certain period in the following way: judging whether the detected segment has a fault according to the following steps via the AIB node:

C1, judging whether the AIB node receives the CCM messages sent on the alternate primary segment and the alternate secondary segment from the DEB node in the first segment protection domain and the second segment protection domain in a certain period, if the CCM messages sent on the alternate primary segment and the alternate secondary segment from the AIB node in the first segment protection domain and the second segment protection domain are both received or are both not received, then the AIB node not performing the tunnel switching action, but continuing to perform the fault detection operation via the AIB node;

if the AIB node does not receive the CCM message sent on the alternate primary segment/the alternate secondary segment from the DEB node in the first segment protection domain/the second segment protection domain but receives the CCM message sent on the alternate secondary segment/the alternate primary segment from the DEB node, then performing step C2;

if the port of the AIB node on the shared link does not receive the CCM message sent on the alternate primary segment from the DEB node in the first segment protection domain and the second segment protection domain and the port of the AIB node in the first segment protection domain/the second segment protection domain does not receive the CCM message sent on the alternate secondary segment from the DEB node in this segment protection domain either, then performing step C3;

C2, the AIB node switching the tunnel on the alternate primary segment/the alternate secondary segment in the first segment protection domain/the second segment protection domain into the alternate secondary segment/ the alternate primary segment, and then continuing to perform the fault detection work via the AIB node;

C3, the port of the AIB node in the second segment protection domain/the first segment protection domain stopping sending the CCM message on the alternate secondary segment to the DEB node in the second segment protection domain/the first segment protection domain; the DEB node not receiving the CCM message sent on the alternate secondary segment from the AIB node in a certain period, and then the DEB node switching the tunnel on the alternate secondary segment in the second segment protection domain/the first segment protection domain into the alternate primary segment, and then continuing to perform the fault detection work via the DEB node.

8. The system for detection of claim 7, wherein said CCM message includes: a source media access control (MAC) address of the detected segment and a destination MAC address of the detected segment.

* * * * *